United States Patent
Abe et al.

(10) Patent No.: US 7,543,489 B2
(45) Date of Patent: Jun. 9, 2009

(54) METHOD AND DEVICE FOR DETERMINING ENDSTAGE OF LIFETIME OF RUN-FLAT TIRE UNDER RUN-FLAT STATE

(75) Inventors: Atsushi Abe, Yokohama (JP); Eishi Ichihara, Sayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/578,059

(22) PCT Filed: Apr. 5, 2005

(86) PCT No.: PCT/JP2005/006662

§ 371 (c)(1),
(2), (4) Date: Jan. 23, 2008

(87) PCT Pub. No.: WO2005/100053

PCT Pub. Date: Oct. 27, 2005

(65) Prior Publication Data

US 2008/0115573 A1    May 22, 2008

(30) Foreign Application Priority Data

Apr. 12, 2004    (JP) .............................. 2004-116585

(51) Int. Cl.
*G01M 17/02* (2006.01)
(52) U.S. Cl. ........................................ 73/146; 340/442
(58) Field of Classification Search ........ 73/146–146.8; 340/442–447
See application file for complete search history.

(56) References Cited

U.S. PATENT DOCUMENTS 6,286,574 B1 * 9/2001 Michelot et al. ......... 152/381.6
6,952,956 B2 * 10/2005 Dufournier et al. ........... 73/146

2006/0093015 A1 * 5/2006 Ichihara et al. ............... 374/45

FOREIGN PATENT DOCUMENTS

| JP | 3-262715 A | 11/1991 |
|---|---|---|
| JP | 2003-508299 A | 3/2003 |
| JP | 2004-504213 A | 2/2004 |
| JP | 2004-331009 A | 11/2004 |
| JP | 2005-35394 A | 2/2005 |
| JP | 2005-88874 A | 4/2005 |
| WO | WO 01/17806 A1 | 3/2001 |
| WO | WO 2004/014671 A1 | 2/2004 |
| WO | WO 2004/091943 A1 | 10/2004 |

* cited by examiner

*Primary Examiner*—Andre J Allen
*Assistant Examiner*—Jermaine Jenkins
(74) *Attorney, Agent, or Firm*—Sughrue Mion, PLLC

(57) ABSTRACT

The present invention provides a method and device for determining an end stage of lifetime of a run-flat tire under a run-flat state. The method includes the step S1 of monitoring the tire internal pressure on a vehicle equipped with a run-flat tire system comprising run-flat tires and tire information transmitter to determine that the tire starts running under a run-flat state when the tire internal pressure becomes lower than a given internal pressure, the step S2 of measuring the temperature of the tire during running at the run-flat state, the step S3 of calculating a rate of change in temperature per unit time based on the measured temperature value of the tire, and the step S4 of comparing the rate of change with a given negative threshold to determine that the run-flat tire is in an end stage of lifetime under a run-flat state when the rate of change in temperature is smaller than the given threshold.

15 Claims, 4 Drawing Sheets

METHOD AND DEVICE FOR DETERMINING ENDSTAGE OF LIFETIME OF RUN-FLAT TIRE UNDER RUN-FLAT STATE

TECHNICAL FIELD

The present invention relates to a method and device for determining an end stage of lifetime of a run-flat tire under a run-flat state.

RELATED ART

Recently, in terms of a safety operation of a pneumatic tire mounted on a vehicle, such a tire has drawn attention that is provided with a detection device for detecting a running state under abnormal service conditions, such as lowering of a tire internal pressure and excess of a load or a running speed, which may shorten the running lifetime of the tire, and a running state predicting an occurrence of troubles such as burst.

A known type of such a detection device is, for example, an internal pressure-monitoring device which monitors the internal pressure of the tire and warns the driver to pay attention by giving an alarm or the like when the internal pressure is extraordinarily decreased. Also, Japanese Patent Application Laid-open No. H3-262715 (JP 03-262715A) discloses a method for detecting the surface temperature of a tread portion of a tire in which a temperature sensor is provided in a tire house to face the surface of the tread portion of the tire. Further, WO 01/17806 discloses a technique which monitors the temperature of a tire to determine an abnormal running condition when a rising rate or an absolute value of the temperature exceeds a certain threshold.

However, these conventional techniques determine whether the running conditions including the internal pressure of the tire are merely abnormal or not and do not quantitatively measure the extent of the abnormal running condition. Consequently, the driver can recognize that the abnormal running condition occurs, but cannot know whether the traveling with the tire can be continued or not, i.e. whether it is the end of lifetime of the tire.

This is especially the case for run-flat tires which have been developed on the premise of continuously running over a certain distance even if the tire internal pressure (including the tire internal pressure of zero at gauge pressure) is lowered with the tire getting punctured and the tire is deformed into a run-flat state. For example, a side-reinforced run-flat tire supports the load under the run-flat state primarily with reinforcing members which have crescent-like sectional shape and are embedded in sidewalls of the tire. In some running conditions, keeping the run-flat traveling promotes a damage of the tire and eventually the tire is easily broken down, so that traveling under such a damaged condition of the tire is extremely dangerous. Accordingly, it is very important for a safety driving to know the end stage of the lifetime of the tire.

In order to determine the end stage of the lifetime of such a side-reinforced run-flat tire, in WO 04/14671, the present inventors proposed a method, device and recording medium for calculating a residual lifetime of a run-flat tire in which tire temperature and running time on the tire continuously running under the run-flat state are measured and the residual lifetime is calculated on the basis of these measured values and critical temperature at which the tire is statistically broken down.

DISCLOSURE OF THE INVENTION

With the method disclosed in WO 04/14671, however, a tire which is judged as not yet reaching the end stage of lifetime may occasionally break in practice and thus cannot further continue to travel under the run-flat state.

It is, therefore, an object of the present invention to provide a method and device for determining a point of time which is immediately before the run-flat traveling cannot be continued any more, i.e. determining an end stage of lifetime of a run-flat tire under run-flat state.

To achieve the above-mentioned object, the first aspect of the present invention is a method for determining an end stage of lifetime of a run-flat tire under a run-flat state, comprising steps of; monitoring the tire internal pressure on a vehicle equipped with a run-flat tire system comprising run-flat tires and tire information transmitter to determine that the tire starts running under a run-flat state when the tire internal pressure becomes lower than a given internal pressure; measuring the temperature of the tire during running at the run-flat state; calculating a rate of change in temperature per unit time based on the measured temperature value of the tire; and comparing the rate of change with a given negative threshold to determine that the run-flat tire is in an end stage of lifetime under a run-flat state when the rate of change in temperature is smaller than the given threshold.

The given internal pressure of the tire is preferably 100 kPa (relative pressure).

The measured temperature of the tire is preferably an ambient temperature in a cavity of the tire.

The given threshold is preferably −4 deg. C./min.

Moreover, the method preferably includes a step of comparing the rate of change in the temperature with the rate of change in the temperature calculated immediately before to determine that the run-flat tire is in an end stage of lifetime under a run-flat state when the rate of change in temperature is larger than the rate of change in temperature calculated immediately before.

Further, the method preferably includes a step of comparing the measured temperature of the tire with a critical temperature at which the tire is statistically broken down to determine that the run-flat tire is in an end stage of lifetime under a run-flat state when the measured temperature is higher than the critical temperature.

Furthermore, the method preferably includes a step of calculating the second derivative $f(t)''$ of a function $f(t)$ in which the measured temperature of the tire increases with continuous running time t in a curve to determine that the run-flat tire is in an end stage of lifetime under a run-flat state when the value of $f(t)''$ is a positive value.

The second aspect of the present inventions is a device for determining an end stage of lifetime of a run-flat tire under a run-flat state, comprising internal pressure-detecting means for detecting abnormal decrease of the internal pressure of the tire, temperature-measuring means for measuring the temperature of the tire, a tire information transmitter for transmitting information from the internal pressure-detecting means and the temperature measuring means, a tire information receiver for receiving the information from the tire information transmitter, first computing means for calculating a starting point of run-flat running based on the received information, second computing means for calculating a rate of change in temperature per unit time from the received information based on the measured temperature of the tire, memory means for storing at least a given negative threshold of the rate of change in temperature, and first determining means for comparing the rate of change in temperature calculated by the second computing means with the threshold stored in the memory means to determine that the run-flat tire is in an end stage of lifetime under a run-flat state when the rate of change is smaller than the given threshold.

Further, the temperature-measuring means preferably measures an ambient temperature in a cavity of the tire.

Moreover, the tire information transmitter is preferably a transponder.

Furthermore, the threshold stored in the memory means is preferably −4 deg. C./min.

The device preferably includes second determining means for storing the rate of change in temperature calculated immediately before and comparing the rate of change in temperature calculated by the second means with the immediately preceding rate of change in temperature stored in the memory means to determining that the run-flat tire is in an end stage of lifetime under a run-flat state when the rate of change in temperature is larger than the immediately preceding rate of change in temperature.

Additionally, the memory means preferably stores a critical temperature at which the tire is statistically broken down and the device preferably includes third determining means for comparing the temperature of the tire measured by the temperature-measuring means with the critical temperature stored in the memory means to determine the run-flat tire is in an end stage of lifetime under a run-flat state when the measured temperature of the tire is higher than the critical value.

The device preferably includes third computing means for calculating the second derivative f(t)" of a function f(t) in which the measured temperature of the tire increases with continuous running time t in a curve and forth determining means for determining that the run-flat tire is in an end stage of lifetime under a run-flat state when the value of f(t)" is a positive value.

The device preferably include warning means for giving an alarm signal when the run-flat tire is determined to be in an end stage of lifetime under a run-flat state.

According to the present invention, it is possible to determine a point of time which is immediately before the run-flat traveling cannot be continued any more, i.e. determining an end stage of lifetime of a run-flat tire under run-flat state while the run-flat tire is traveling under the run-flat state.

BEST MODE FOR CARRYING OUT THE INVENTION

Figure 1:
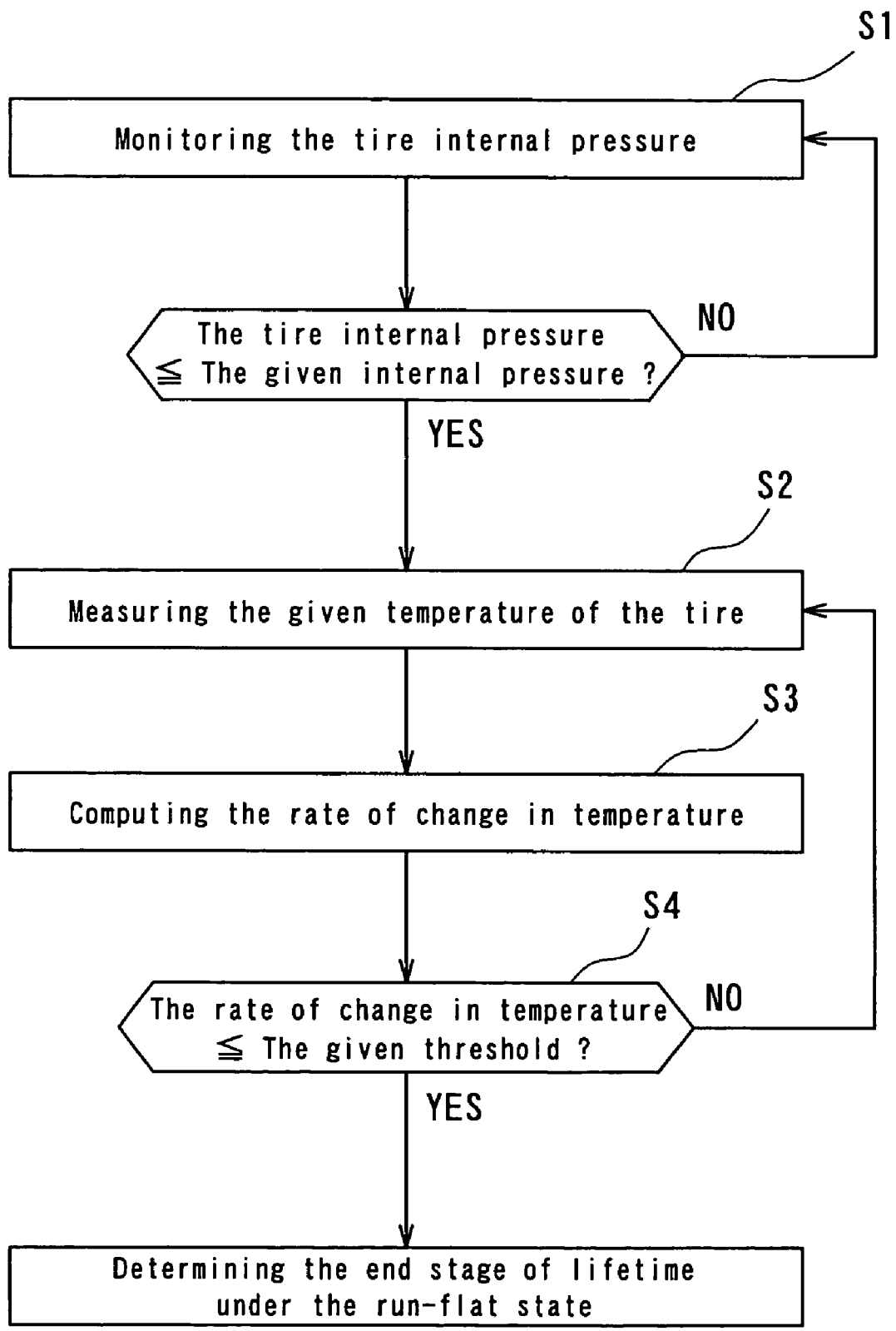
FIG. 1 shows a flow chart of a representative method according to the first aspect of the present invention.

With reference to the drawings, embodiments of the present invention will be discussed below. FIG. 1 is a flow chart of a representative method of determining an end stage of lifetime of a run-flat tire under a run-flat state according to the first aspect of the present invention.

A not-shown vehicle to which the first aspect of the present invention is applied has run-flat tires and tire information transmitters each arranged in the respective tire. It is noted that the term "run-flat tire" used herein includes a so-called side reinforced run-flat tire in which reinforcing rubbers having a crescent-like sectional shape are arranged on at least sidewall portions of the tire, a so-called core type run-flat tire in which a ring-shaped rigid body is inserted into a cavity defined by a tire and a wheel, and a so-called tube type run-flat tire in which a tire having a smaller diameter is further inserted into the tire. It is also noted that the term "tire information transmitter" used herein refers to a device for transmitting information in the tire such as temperature and pressure to the vehicle in a wired and/or wireless manner.

In the first step S1, internal pressure of the tire is measured and then the tire internal pressure is compared with a given internal pressure. If the tire internal pressure is higher than the given pressure, the tire is determined to travel in a normal state and the tire internal pressure is continuously monitored. If the tire internal pressure is lower than the given pressure, that point of time is determined to be a starting point of a run-flat state. Then, in the second step S2, temperature of the tire is measured. It is noted that the term "tire temperature" used herein includes not only ambient temperature in a cavity defined by a tire and a wheel, but also surface temperature of the tire, temperature of the tire component members and, as far as the tire temperature can be indirectly obtained, wheel temperature. Further, in the third step S3, a rate of change in temperature per unit time is calculated on the basis of the temperature measured in the second step. The "rate of change in temperature" is a positive value if the temperature is raised during the unit time, and is negative value if the temperature is lowered during the unit time. Subsequently, in the forth step S4, the rate of change in temperature is compared with a given negative threshold and, if the rate of change in temperature is below the threshold, the tire is determined to be in an end stage of lifetime under a run-flat state. Since the threshold is a negative value, the rate of change in temperature is also a negative value, that is, the tire temperature measured during the unit time decreases when the tire is determined to be in an end stage of lifetime under a run-flat state.

Figure 2:
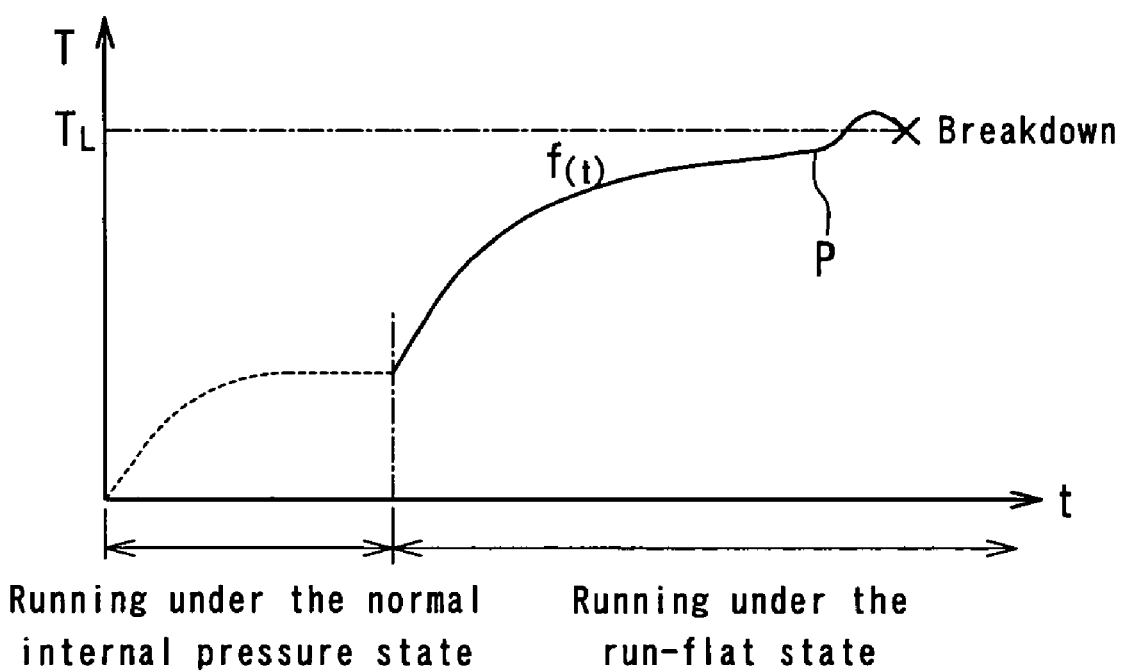
FIG. 2 is a graph showing a relationship between a given temperature T in the tire and a running time t.

In the next, it will be discussed, along with its operation, how the present inventors have completed the present invention. The inventors noticed that when the run-flat tire continues to travel under the run-flat state, there is a relationship between the measured tire temperature T and the running time t, which follows the exponential function f(t) as shown in FIG. 2. In this connection, the inventors found that the tire temperature T increases with the running time t, and the tire temperature has a critical temperature at which the tire is statistically broken down, and the curve representing the change of the given temperature transits from an upwardly convex shape to a downwardly convex shape immediately before the tire traveling under a run-flat state is broken down. Based on these findings, the inventors proposed in WO 04/14671 that a method, device and recording medium for determining a lifetime and its end stage of a run-flat tire continuously running under the run-flat. With this method, however, a tire which is judged as not yet reaching the end stage of lifetime may occasionally break in practice and thus cannot further continue to travel under the run-flat state.

The present inventors repeatedly studied the cause and found the following points. That is, the conventional method for determining a lifetime and its end stage takes only malfunctions caused by the tire component member being broken down due to a temperature rising into consideration, but, in fact, malfunctions is also caused by a breakage of the sidewall portion which is subjected to a large deformation during running under the run-flat state and to stress concentration, which case cannot be detected by the conventional method for determining the lifetime based on the temperature rising. The present inventors further made a study on a method capable of readily detecting a failure caused by the breakage of the sidewall portion and then found that when the sidewall portion is broken down, the interior of the cavity in the tire is communicated with the atmosphere and thus the outer air with a low temperature flows into the tire cavity to drastically lower the tire temperature. Consequently, the present inventors conceived that the failure caused by the breakage of the sidewall portion can be also detected by detecting the temperature drop of the tire, i.e. calculating the rate of change in temperature per unit time based on the measured tire temperature and then comparing the calculated rate with the given negative threshold to determine that the run-flat tire is in the end stage of lifetime under the run-flat state. Accordingly, it is possible to accurately determine the end stage of the lifetime of the run-flat tire under the run-flat state. The present invention was completed in this way.

The rate of change in temperature nay be calculated at every measuring interval, but for the purpose of removing fluctuation components of the measured temperature due to the noise, it is preferred to, for example, filter out the high-frequency component or smooth the rate with calculating moving averages within a certain time.

The given internal pressure of the tire is preferably 100 kPa (relative pressure). This is partly because the internal pressure of the tire cannot take such a low pressure during the normal running condition, and additionally because the above-mentioned bending deformation of the sidewall portion becomes larger to lead a breakdown when the internal pressure of the tire is below 100 kPa.

The measured temperature of the tire is preferably an ambient temperature in a cavity of the tire. Other temperatures such as those of the tire component members may be employed as the tire temperature, but rapid determination can be realized with adopting the ambient temperature in the cavity of the tire as the tire temperature since the temperature change is at first observed in the ambience of the cavity of the tire when the outer air with a low temperature flows into it.

The given threshold is preferably −4 deg. C./min. Common causes of lowering the tire temperature during the run-flat running condition other than the breakage of the sidewall portion are slower running speed, running on a wet road surface and the like. In these cases, the rate of change in temperature is at most −2 deg. C./min. In view of this, the threshold is set at −4 deg. C./min. to be apparently distinguished from the temperature decrease due to the common causes, which enable to accurately detect the temperature decrease caused by the breakage of the sidewall portion as well.

In addition, the method preferably includes a step of comparing the rate of change in the temperature with the rate of change in the temperature calculated immediately before to determine that the run-flat tire is in an end stage of lifetime under a run-flat state when the rate of change in temperature is larger than the rate of change in temperature calculated immediately before. As mentioned in the above, in addition to the failure caused by the breakage of the sidewall portion due to the run-flat tire being subjected to a large bending deformation and a stress concentration, the failure of the run-flat tire may be caused by the breakage of the tire component member due to the temperature rising. In order to accurately determine the end stage of lifetime of the run-flat under the run-flat state, it is preferred to detect both of these failures. According to the inventors' research, it is known that the curve representing the change in the tire temperature transits from an upwardly convex shape to a downwardly convex shape, as shown in FIG. 2, immediately before the failure due to the temperature rising occurs. Accordingly, it is possible to determine the end stage of lifetime of the run-flat tire under the run-flat state based on the temperature rising by detecting the transition, i.e. detecting that the rate of change in temperature is larger than that calculated immediately before.

The method preferably includes a step of comparing the measured temperature T of the tire with a critical temperature $T_L$ at which the tire is statistically broken down to determine that the run-flat tire is in an end stage of lifetime under a run-flat state when the measured temperature T is higher than the critical temperature $T_L$. As mentioned in the above, it is statistically known that the likelihood of causing the failure becomes extremely high when the tire temperature T exceeds the critical temperature $T_L$ during the run-flat running condition. Thus, the tire is determined to be in the end stage of lifetime under the run-flat state at the time where the measured tire temperature T exceeds the critical temperature $T_L$, so that the run-flat tire is ensured to safely operate.

The method preferably includes a step of calculating the second derivative $f(t)''$ of a function $f(t)$ in which the measured temperature of the tire increases with continuous running time t in a curve to determine that the run-flat tire is in an end stage of lifetime under a run-flat state when the value of $f(t)''$ is a positive value. As already mentioned, it is known from the study made by the inventors that the curve representing the change in the tire temperature transits from an upwardly convex shape to a downwardly convex shape at an inflection point P, as shown in FIG. 2, immediately before the failure due to the temperature rising occurs. Accordingly, it is possible to determine the point of time at which the second derivative $f(t)''$ of a function $f(t)$ turns from a negative value to a positive value, i.e. the above-mentioned inflection point P occurs as the end stage of lifetime of the run-flat tire under the run-flat state. Thus, the run-flat tire can be safely operated.

In addition to the step of detecting the failure caused by the breakage of the sidewall, which is the forth step S4 of comparing the rate of change in temperature with the given negative threshold to determine that the run-flat tire is in the end stage of lifetime under the run-flat state when the rate of change in temperature is lower than the threshold, the method may include a step of detecting the failure caused by the breakage of the tire component member due to the temperature rising, which is a step of comparing the given temperature T with the critical temperature $T_L$ at which the tire is statistically broken down to determine that run-flat tire is in the end stage of lifetime under run-flat running condition when the given temperature T is higher than the critical temperature $T_L$, and/or a step of calculating the second derivative $f(t)''$ of a function $f(t)$ in which the measured temperature of the tire increases with continuous running time t in a curve to determine that the run-flat tire is in an end stage of lifetime under a run-flat state when the value of $f(t)''$ is a positive value. In this case, it is preferred to determine the point of time at which at least any one of these steps determines the end stage of lifetime of the run-flat tire under the run-flat state as the end stage of lifetime of the run-flat tire.

Figure 3:
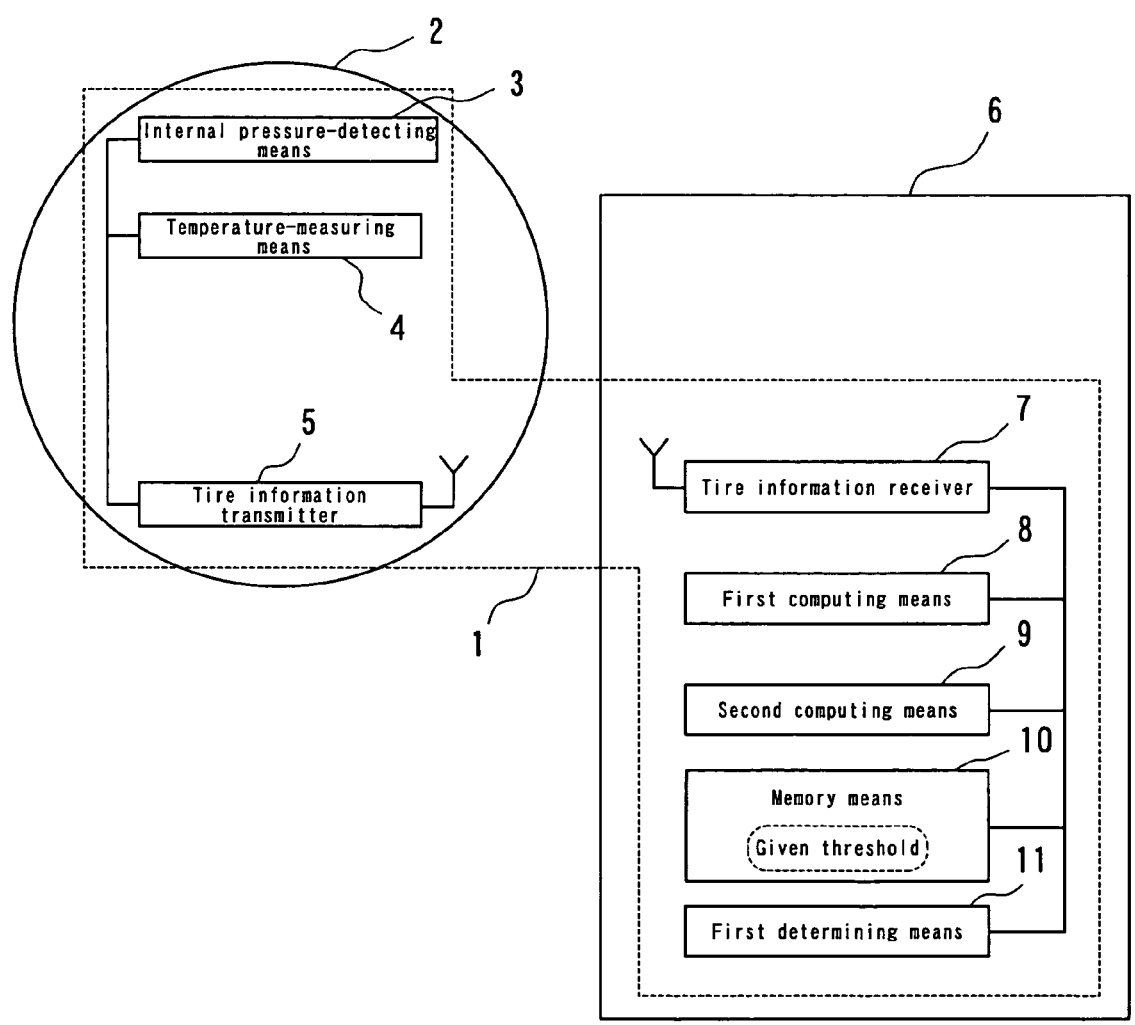
FIG. 3 is a block diagram showing a configuration of a representative device according to the second aspect of the present invention.

Next, a device according to the second aspect of the present invention is discussed. FIG. 3 is a block diagram showing a configuration of a representative embodiment according to the second aspect. A device 1 for determining an end stage of lifetime of a run-flat tire under a run-flat state has internal pressure-detecting means 3 arranged in the run-flat tire 3 for detecting abnormal decrease of the internal pressure of the tire 2, temperature-measuring means 4 for measuring the temperature of the tire, and a tire information transmitter 5 for transmitting information from the internal pressure-detecting means 3 and the temperature measuring means 4. A pressure sensor, a pressure switch or the like may be used as the internal pressure-detecting means, and a resistance thermometer, a thermocouple or the like may be used as the temperature-measuring means 4. In FIG. 3, there are provided only one internal pressure-detecting means 3 and one temperature-measuring means 4, but the number of these means may be increased as needed to measure the internal pressure and temperature at more than one point.

The device 1 for determining an end stage of lifetime of a run-flat tire under a run-flat state further has a tire information receiver 7 for receiving the information from the tire information transmitter 5, first computing means 8 for calculating a starting point of run-flat running based on the received information, second computing means 9 for calculating a rate of change in temperature per unit time from the received information based on the measured temperature of the tire, memory means 10 for storing at least a given negative threshold of the rate of change in temperature, and first determining means 11 for comparing the rate of change in temperature calculated by the second computing means with the threshold stored in the memory means to determine that the run-flat tire is in an end stage of lifetime under a run-flat state when the rate of change is smaller than the given threshold. In FIG. 3, the data transfer between the tire information transmitter 5 and the tire information receiver 7 is carried out in a wireless manner, by way of example, but it may carried out in a wired manner.

The operation of this device is now discussed. The internal pressure detecting means 3 arranged in the run-flat tire 2 monitors the tire internal pressure and transmits information about this to the first computing means 8 via the tire information transmitter 5 and the tire information receiver 7. The first computing means 8 calculates a starting point of the run-flat running condition and outputs a run-flat running start signal. Specifically, for example, in the case where the internal pressure-detecting means is a pressure sensor, the first computing means 8 compares the given tire internal pressure stored in the memory means 10 or the like with the obtained information. If the tire internal pressure is decreased to below the given internal pressure, the device determines that the run-flat tire is under the run-flat state and outputs the run-flat running start signal. Alternatively, in the case where the internal pressure-detecting means 3 is, for example, a pressure switch, the device determines that the point of time at which the signal from the internal pressure-detecting means 3 turns from ON to OFF or from OFF to ON is the starting point of the run-flat running condition, and outputs the run-flat running start signal.

On the other hand, the temperature-measuring means 4 measures the tire temperature and transmits information about this to the second computing means 9 via the tire information transmitter 5 and the tire information receiver 7. The second computing means calculates the rate of change in temperature per unit time based on the measured tire temperature from the transmitted information, and outputs a signal relating to the rate of change in temperature. The rate of change in temperature nay be calculated at every measuring interval, but for the purpose of removing fluctuation components of the measured temperature due to the noise, it is preferred to, for example, filter out the high-frequency component or smooth the rate with calculating moving averages within a certain time.

When the vehicle travels under the run-flat running condition, i.e. the runflat running start signal is output from the first computing means 8, the first determining means 11 compares the rate of change in temperature output from the second computing means 9 with the given threshold stored in the memory means 10. If the rate of change in temperature is smaller than the threshold, the first determining means 11 determines that the run-flat tire is in the end stage of lifetime under the run-flat state, and outputs a run-flat running end stage signal.

Accordingly, when the sidewall portion is broken down due to the bending deformation, the cavity of the tire and the atmosphere is communicated and thus the outer air with a low temperature flows into the tire cavity to drastically lower the tire temperature. Consequently, the rate of change in temperature per unit time of the tire becomes smaller than the given threshold and, as a result, the failure caused by the breakage of the sidewall portion can be detected by the device 1.

The temperature-measuring means 4 measures preferably an ambient temperature in the cavity of the tire. Other temperatures such as those of the tire component members may be employed as the tire temperature, but rapid determination can be realized with adopting the ambient temperature in the cavity of the tire as the tire temperature since the temperature change is at first observed in the ambience of the cavity of the tire when the outer air with a low temperature flows into it.

The tire information transmitter 5 is preferably a transponder. The run-flat tire 2 rotates at a high speed, so that the tire information transmitter 5 is difficult to be coupled with a signal line to the tire information receiver 7 as well as with an electric power line for supplying operating power. With using the transponder as the tire information transmitter 5, these lines can be eliminated.

The given threshold stored in the memory means is preferably −4 deg. C./min. Common causes of lowering the tire temperature during the run-flat running condition other than the breakage of the sidewall portion are slower running speed, running on a wet road surface and the like. In these cases, the rate of change in temperature is at most −2 deg. C./min. In view of this, the threshold is set at −4 deg. C./min. to be apparently distinguished from the temperature decrease due to the common causes, which enable to accurately detect the temperature decrease caused by the breakage of the sidewall portion as well.

Figure 4:
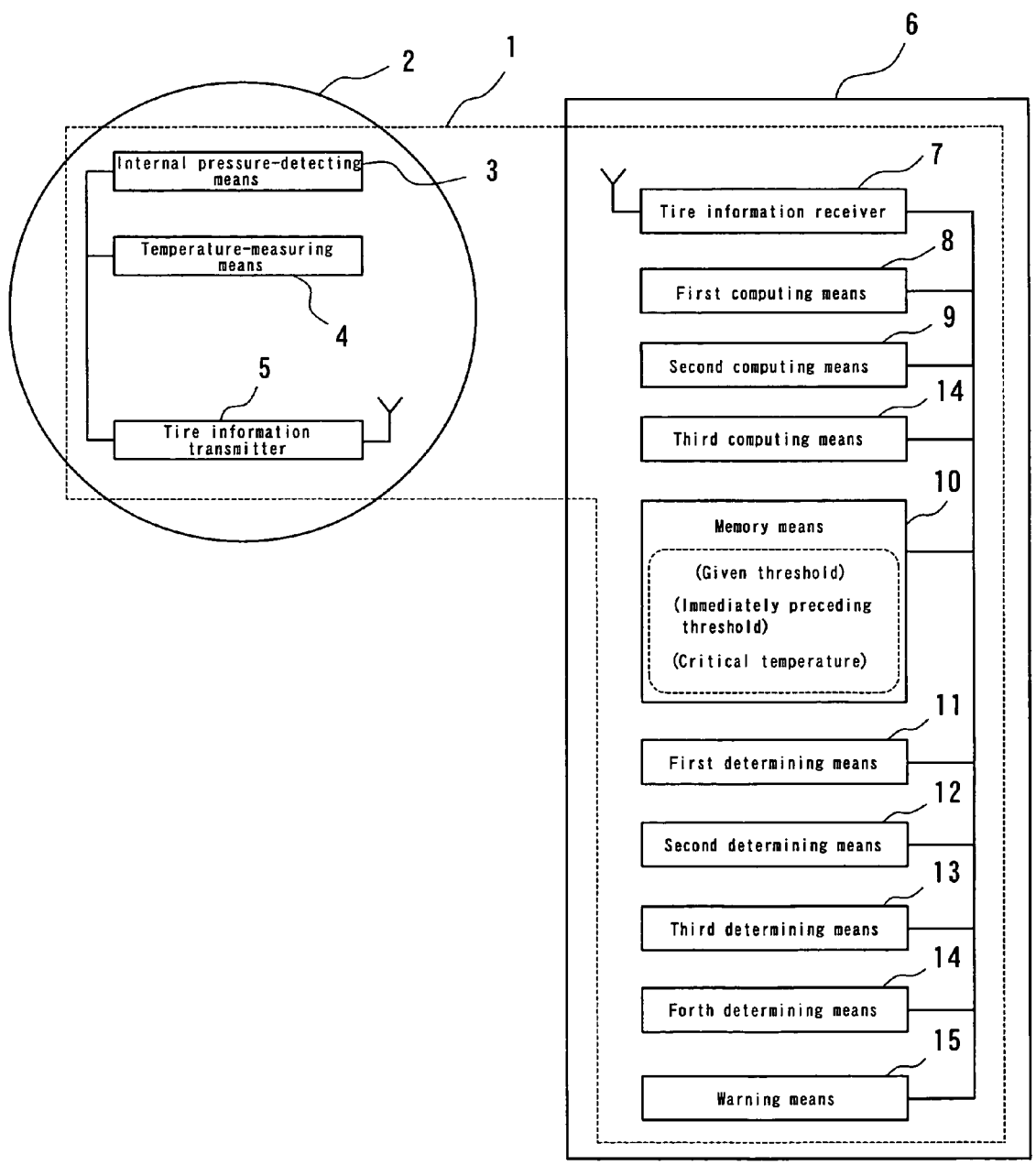
FIG. 4 is a block diagram showing a configuration of another device according to the second aspect of the present invention.

FIG. 4 is a block diagram showing a configuration of another embodiment according to the second aspect of the present invention. As shown in FIG. 4, it is preferred that the memory means 10 further stores the rate of change in temperature calculated immediately before and that the device 1 further has the second determining means 12 for comparing the rate of change in temperature calculated by the second computing means 9 with the immediately preceding rate of change in temperature stored in the memory means 10 to determine that the run-flat tire is in the end stage of lifetime under the run-flat state when the current rate of change in temperature is larger than the immediately preceding rate of change in temperature. As already mentioned, in addition to the failure caused by the breakage of the sidewall portion due to the run-flat tire being subjected to a large bending deformation and a stress concentration, the failure of the run-flat tire may be caused by the breakage of the tire component member due to the temperature rising. In order to accurately determine the end stage of lifetime of the run-flat under the run-flat state, it is preferred to detect both of these failures.

According to the inventors' research, it is known that the curve representing the change in the tire temperature transits from an upwardly convex shape to a downwardly convex shape, as shown in FIG. 2, immediately before the failure due to the temperature rising occurs. Accordingly, it is possible to determine the end stage of lifetime of the run-flat tire under the run-flat state based on the temperature rising by detecting the transition, i.e. detecting that the rate of change in temperature is larger than that calculated immediately before.

It is also preferred that the memory means 10 stores a critical temperature $T_L$ at which the tire is statistically broken down and the device 1 has the third determining means 13 for comparing the tire temperature T measured by the temperature-measuring means 4 with the critical temperature $T_L$ stored in the memory means 11 to determine that the run-flat tire is in the end stage of lifetime under the run-flat state when the measured tire temperature T is higher than the critical temperature $T_L$. As mentioned in the above, it is statistically known that the likelihood of causing the failure becomes extremely high when the tire temperature T exceeds the critical temperature $T_L$ during the run-flat running condition. Thus, the tire is determined to be in the end stage of lifetime under the run-flat state at the time where the measured tire temperature T exceeds the critical temperature $T_L$, so that the run-flat tire is ensured to safely operate.

Further, the device 1 preferably includes third computing means 14 for calculating the second derivative f(t)" of a function f(t) in which the measured temperature of the tire increases with continuous running time t in a curve and forth determining means 15 for determining that the run-flat tire is in an end stage of lifetime under a run-flat state when the value of f(t)" is a positive value. As already mentioned, it is known from the study made by the inventors that the curve representing the change in the tire temperature transits from an upwardly convex shape to a downwardly convex shape at an inflection point P, as shown in FIG. 2, immediately before the failure due to the temperature rising occurs. Accordingly, it is possible to determine the point of time at which the second derivative f(t)" of a function f(t) turns from a negative value to a positive value, i.e. the above-mentioned inflection point P occurs as the end stage of lifetime of the run-flat tire under the run-flat state. Thus, the run-flat tire can be safely operated.

Furthermore, the device preferably include warning means for giving an alarm signal when the run-flat tire is determined to be in an end stage of lifetime under a run-flat state. By warning the driver about the tire being in the end stage of tires, the driver can promptly take a suitable step such as evacuating the vehicle to a safety place. In this case, visible means such as a display and a warning light, audible means such as a buzzer, an alarm and a voice, and tactile means such as a vibrator may be used as the warning means. Alternatively, the warning signal is input to a speed limiter or an output limiter to apply it to a direct regulation of the vehicle.

The descriptions above show only a part of the preferred embodiments of the present invention, and various modifications can be made within the scope of the appended claims. For example, the first computing means 8, the second computing means 9, the third computing means 14, the memory means 10, the first determining means 11, the second determining means 12, the third determining means 13 and the forth determining means 15 may be separately provided, but these means can be integrated in a computer.

EXAMPLES

A device for determining an end stage of lifetime of a run-flat tire under a run-flat state as shown in FIG. 3 is applied to a vehicle equipped with side-reinforced run-flat tires (tire size: 245/40ZR18) and the vehicle was actually driven under the run-flat state and the end stage of lifetime of the tires were determined. The details will be described below.

Capacitance type pressure sensors as internal pressure-measuring means were arranged on the tires. Resistance thermometers as temperature-measuring means were arranged around the valves of the rims. The internal pressure and temperature of the cavities of the tires were measured. The internal pressure and temperature were measured at every 10 seconds. The rate of change in the measured tire temperature was calculated from the average temperature over one minute. The given threshold stored in the memory means was −24 deg./min.

The vehicle was driven on a test course including a winding road under the run-flat state until it was determined in the end stage of lifetime. At the time when the run-flat tire, the rate of change in temperature was determined in the end stage of lifetime was −36 deg./min and the sidewall of the run-flat tire was found to be punctured as a result of a visual inspection.

INDUSTRIAL APPLICABILITY

According to the present invention, it is possible to provide a method and device for determining a point of time which is immediately before the run-flat traveling cannot be continued any more, i.e. determining an end stage of lifetime of a run-flat tire under run-flat state.

The invention claimed is:

1. A method for determining an end stage of lifetime of a run-flat tire under a run-flat state, comprising steps of;
    monitoring the tire internal pressure on a vehicle equipped with a run-flat tire system comprising run-flat tires and tire information transmitter to determine that the tire starts running under a run-flat state when the tire internal pressure becomes lower than a given internal pressure;
    measuring the temperature of the tire during running at the run-flat state;
    calculating a rate of change in temperature per unit time based on the measured temperature value of the tire; and
    comparing the rate of change with a given negative threshold to determine that the run-flat tire is in an end stage of lifetime under a run-flat state when the rate of change in temperature is smaller than the given threshold.

2. The method for determining an end stage of lifetime of a run-flat tire under a run-flat state according to claim 1, wherein the given internal pressure of the tire is 100 kPa (relative pressure).

3. The method for determining an end stage of lifetime of a run-flat tire under a run-flat state according to claim 1, wherein the measured temperature of the tire is an ambient temperature in a cavity of the tire.

4. The method for determining an end stage of lifetime of a run-flat tire under a run-flat state according to claim 1, wherein the given threshold is −4 deg. C./min.

5. The method for determining an end stage of lifetime of a run-flat tire under a run-flat state according to claim 1, further comprising a step of comparing the rate of change in the temperature with the rate of change in the temperature calculated immediately before to determine that the run-flat tire is in an end stage of lifetime under a run-flat state when the rate of change in temperature is larger than the rate of change in temperature calculated immediately before.

6. The method for determining an end stage of lifetime of a run-flat tire under a run-flat state according to claim 1, further comprising a step of comparing the measured temperature of the tire with a critical temperature at which the tire is statistically broken down to determine that the run-flat tire is in an end stage of lifetime under a run-flat state when the measured temperature is higher than the critical temperature.

7. The method for determining an end stage of lifetime of a run-flat tire under a run-flat state according to claim 1, further comprising a step of calculating the second derivative f(t)" of a function f(t) in which the measured temperature of the tire increases with continuous running time t in a curve to determine that the run-flat tire is in an end stage of lifetime under a run-flat state when the value of f(t)" is a positive value.

8. A device for determining an end stage of lifetime of a run-flat tire under a run-flat state, comprising:
- internal pressure-detecting means for detecting abnormal decrease of the internal pressure of the tire;
- temperature-measuring means for measuring the temperature of the tire;
- a tire information transmitter for transmitting information from the internal pressure-detecting means and the temperature measuring means;
- a tire information receiver for receiving the information from the tire information transmitter;
- first computing means for calculating a starting point of run-flat running based on the received information;
- second computing means for calculating a rate of change in temperature per unit time from the received information based on the measured temperature of the tire;
- memory means for storing at least a given negative threshold of the rate of change in temperature; and
- first determining means for comparing the rate of change in temperature calculated by the second computing means with the threshold stored in the memory means to determine that the run-flat tire is in an end stage of lifetime under a run-flat state when the rate of change is smaller than the given threshold.

9. The device for determining an end stage of lifetime of a run-flat tire under a run-flat state according to claim 8, wherein the temperature-measuring means measures an ambient temperature in a cavity of the tire.

10. The device for determining an end stage of lifetime of a run-flat tire under a run-flat state according to claim 8, wherein the tire information transmitter is a transponder.

11. The device for determining an end stage of lifetime of a run-flat tire under a run-flat state according to claim 8, wherein the threshold stored in the memory means is −4 deg. C./min.

12. The device for determining an end stage of lifetime of a run-flat tire under a run-flat state according to claim 8, further comprising second determining means for storing the rate of change in temperature calculated immediately before and comparing the rate of change in temperature calculated by the second means with the immediately preceding rate of change in temperature stored in the memory means to determining that the run-flat tire is in an end stage of lifetime under a run-flat state when the rate of change in temperature is larger than the immediately preceding rate of change in temperature.

13. The device for determining an end stage of lifetime of a run-flat tire under a run-flat state according to claim 8, wherein the memory means stores a critical temperature at which the tire is statistically broken down and the device further comprises third determining means for comparing the temperature of the tire measured by the temperature-measuring means with the critical temperature stored in the memory means to determine the run-flat tire is in an end stage of lifetime under a run-flat state when the measured temperature of the tire is higher than the critical value.

14. The device for determining an end stage of lifetime of a run-flat tire under a run-flat state according to claim 8, further comprising third computing means for calculating the second derivative f(t)" of a function f(t) in which the measured temperature of the tire increases with continuous running time t in a curve and forth determining means for determining that the run-flat tire is in an end stage of lifetime under a run-flat state when the value of f(t)" is a positive value.

15. The device for determining an end stage of lifetime of a run-flat tire under a run-flat state according to claim 8, further comprising warning means for giving an alarm signal when the run-flat tire is determined to be in an end stage of lifetime under a run-flat state.

* * * * *